United States Patent [19]

Eltzroth

[11] 4,247,035

[45] * Jan. 27, 1981

[54] CRANE CONVERSION METHOD

[76] Inventor: James L. Eltzroth, P.O. Drawer 150, Wadsworth, Ohio 44281

[ * ] Notice: The portion of the term of this patent subsequent to Aug. 8, 1995, has been disclaimed.

[21] Appl. No.: 931,123

[22] Filed: Aug. 4, 1978

Related U.S. Application Data

[63] Continuation-in-part of Ser. No. 823,597, Aug. 11, 1977, Pat. No. 4,105,151.

[51] Int. Cl.[3] .............................................. B23K 31/02

[52] U.S. Cl. ..................................... 228/170; 228/119

[58] Field of Search ........................ 228/119, 142, 170

[56] References Cited

U.S. PATENT DOCUMENTS

| | | | |
|---|---|---|---|
| 1,134,216 | 4/1915 | Mosler et al. | 228/170 |
| 3,149,730 | 9/1964 | Mork | 212/59 R |
| 3,669,281 | 6/1972 | Woodside et al. | 212/144 |
| 3,754,666 | 8/1973 | Suverkrop | 212/59 R |
| 3,777,918 | 12/1973 | Barber | 414/694 |
| 3,870,162 | 3/1975 | Nakajo | 212/59 R |
| 4,105,151 | 8/1978 | Eltroth | 228/170 |

*Primary Examiner*—Kenneth J. Ramsey

*Attorney, Agent, or Firm*—Reese Taylor

[57] ABSTRACT

A method for altering or retrofitting an excavating crane such as a trench hoe, back hoe, etc. into a lifting crane having a geometry suitable for scrap handling is disclosed. The conversion method is performed by cutting appropriate notches into the side plates or side walls of the main boom of a conventional crane in an area adjacent the point of connection between the main hydraulic piston and the main boom; bending the boom to form a new geometry on the main boom; forming a suitably configured insert and attaching said insert in the opening formed by the bending of the boom. In this fashion, the geometry of the main boom may be altered without the necessity for altering either the pivot point, the stroke of the pistons or any other portion of the overall crane assembly in order to change the lifting arc and create greater lifting capability. By such modification, the crane becomes suitable for scrap handling and the lifting of the substantial weights involved as contrasted to utilization in excavating operations wherein the outward reach of the boom arm is of primary importance.

4 Claims, 11 Drawing Figures

FIG. 1
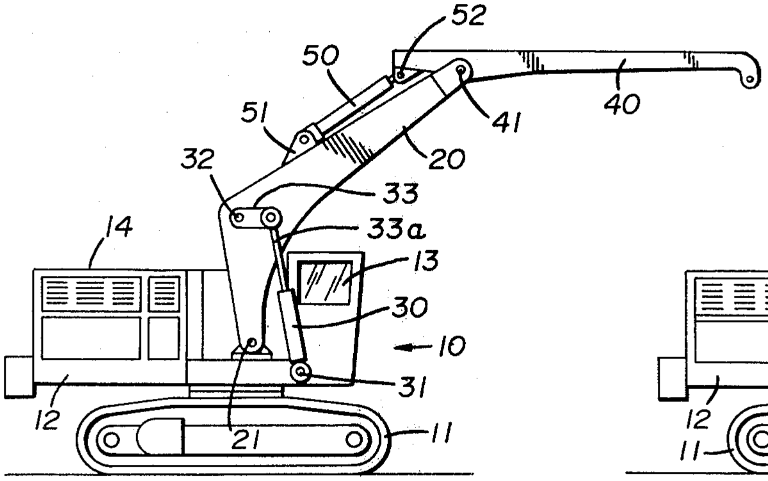
FIG. 2
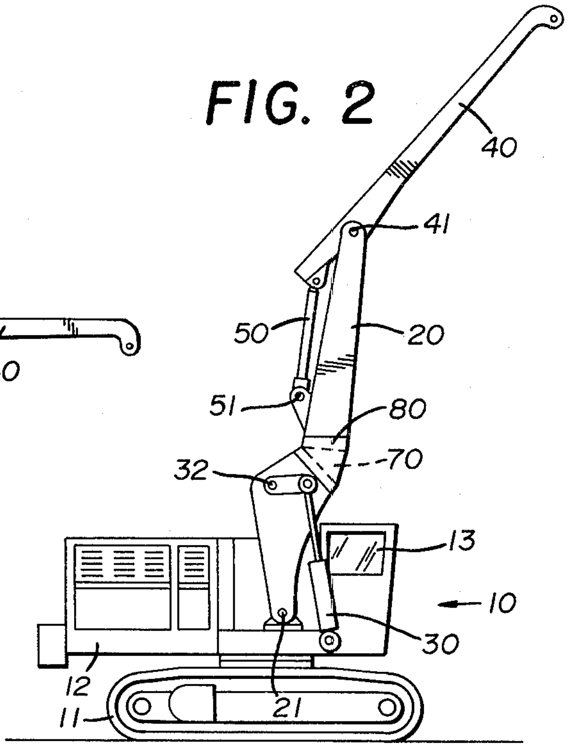
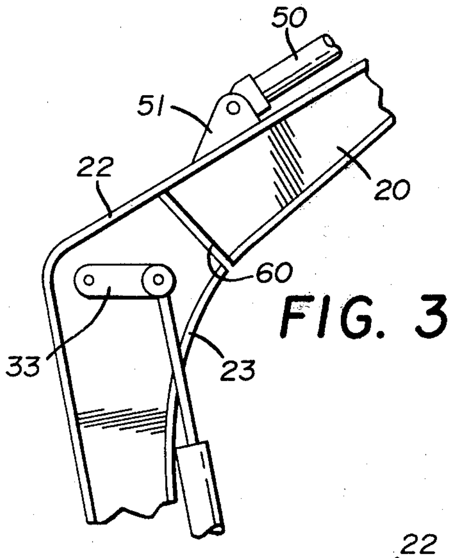
FIG. 3
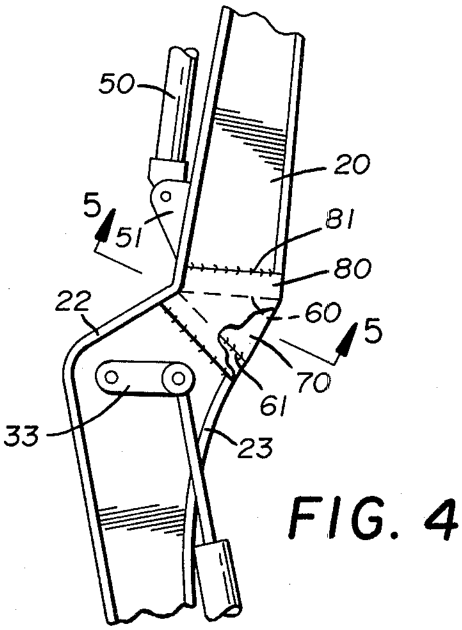
FIG. 4
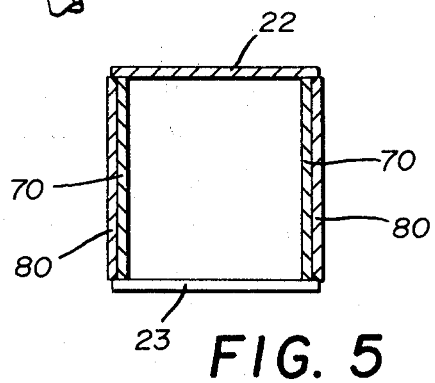
FIG. 5

FIG. 6
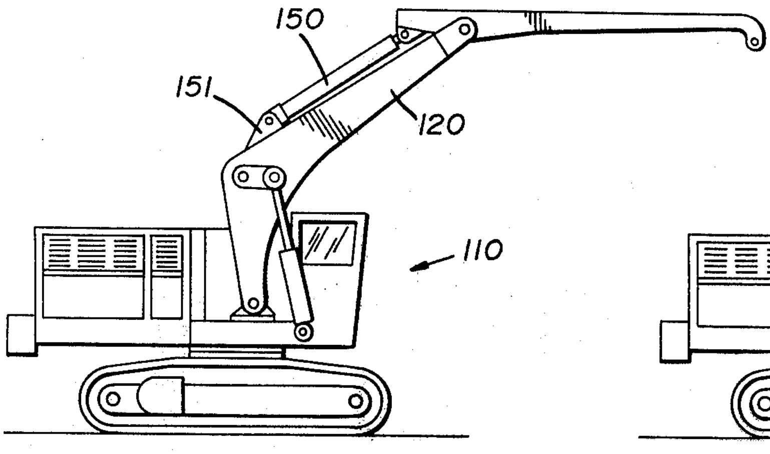
FIG. 7
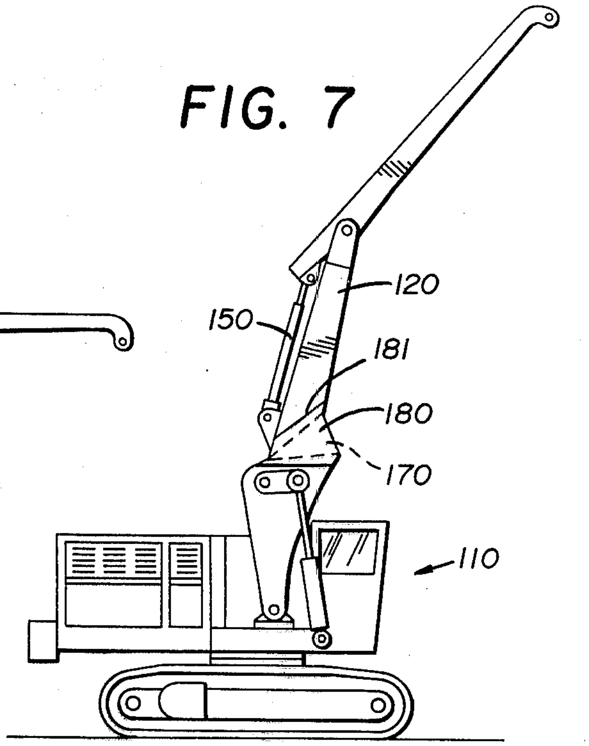
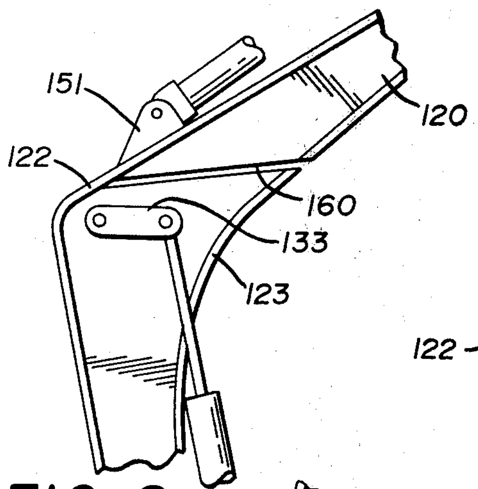
FIG. 8
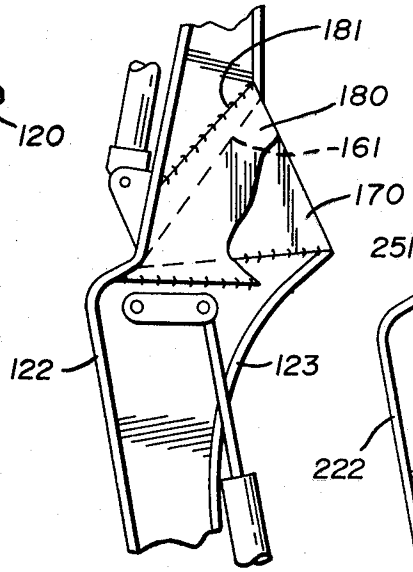
FIG. 9
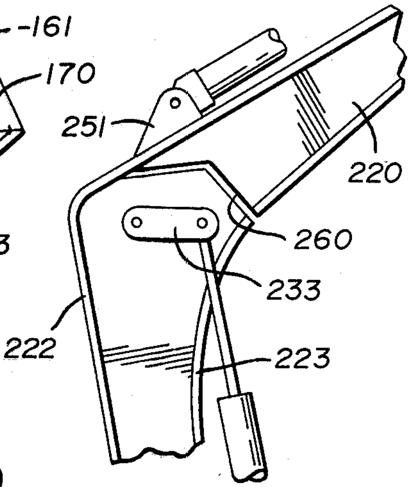
FIG. 10
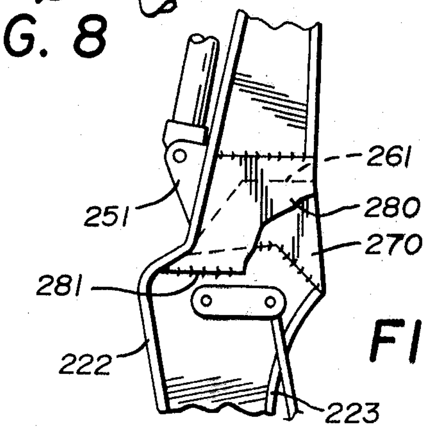
FIG. 11

CRANE CONVERSION METHOD

RELATED APPLICATIONS

This application is a continuation-in-part of applicant's earlier filed application, Ser. No. 823,597, filed Aug. 11, 1977, for Crane Conversion Method and now U.S. Pat. No. 4,105,151.

BACKGROUND OF THE INVENTION

This invention relates in general to heavy duty cranes and relates in particular to a method and apparatus for converting a conventional crane, which is designed primarily for digging or excavating purposes, to one primarily designed for lifting purposes with a minimal amount of modification and alteration to the basic structure of the crane.

PRIOR ART STATEMENT

There are a number of known cranes available most of which generally include a working platform mounted on a variety of carriages and being pivotable thereon about a vertical axis. These units generally have a substantially L shaped main boom which is pivotably mounted about a horizontal axis on the working platform and is movable to elevated or depressed conditions by operation of a main hydraulic cylinder and piston. Generically, cranes of this type are referred to as "knuckle boom" cranes.

The outboard end of the main boom of a crane of this type generally carries a jib boom which will have a shovel or other type excavating device attached to its distal end. Such a boom is operated by an auxiliary or secondary hydraulic cylinder and piston which interconnects the main boom and the jib boom. The jib boom is capable of reaching out from the working platform and indeed capable of being depressed so as to dig below the surface of the supporting ground.

The prior art also discloses lifting type cranes which have a somewhat sharper angular configuration to the main boom and which swing in an arc which permits greater weights to be lifted because of the fact that the arc is somewhat shorter.

However, both of the types of crane units just described are specifically designed for specific purposes namely, either for lifting or for excavating.

Much the same can be said of the hoists or cranes disclosed in Woodside U.S. Pat. No. 3,669,281; Suverkrop U.S. Pat. No. 3,754,666 and Nakajo U.S. Pat. No. 3,870,162.

For example, Woodside U.S. Pat. No. 3,669,281 discloses a specially designed boom and jib for lifting purposes.

Suverkrop U.S. Pat. No. 3,754,666 discloses a folding crane designed for lifting purposes and posessing the capability of nearly vertical lifting.

Nakajo U.S. Pat. No. 3,870,162 is also a foldable crane capable of achieving nearly vertical lifting.

Mork U.S. Pat. No. 3,149,730 does disclose a convertible crane which is capable of being converted from a mobile crane to a tower crane configuration and has a main boom and jib boom with the conversion being accomplished by removing certain pins in the top end of the main boom and rotating it followed by repinning so as to achieve the new configuration.

Barber U.S. Pat. No. 3,777,918 discloses a clam shell attachment which can be attached to a back hoe for excavating purposes.

It is believed that the above is a fairly representative showing of the prior art known to Applicant. However, none of this art discloses a method for converting a digging type crane to a lifting type crane without significant modification of the main boom, which method is the principal object of this invention.

SUMMARY OF THE INVENTION

In Applicant's co-pending application Ser. No. 823,597 a method of conversion is disclosed in which V-shaped notches are cut into the side walls of the main boom from the top wall toward the bottom wall. The boom is then folded back or bent so that the edge surfaces of the opening or the notch thus formed are brought into abuttment following which they are welded together so as to impart a new geometry to the main boom.

While such a method has been found satisfactory in practice it has also been found that in certain applications it is unsuitable due primarily to the peculiarities of the basic crane design. Therefore, further improved conversion methods are desirable.

Thus, it has been discovered that it is possible if desired to cut a notch into the side walls of the main boom starting from the bottom wall and extending toward the top wall thereof. It has also been found that once such a notch has been cut, that the main boom can be bent to the desired geometry so that its top surface forms an obtuse angle in contrast to its previous straight line configuration.

It has also been found that following such steps it is possible to fabricate inserts having a configuration conforming to the configuration of the opening formed by bending the main boom following which these inserts can be welded or otherwise secured to the edges of the notch to insure that the main boom retains its new configuration. Optionally a cover plate can be welded or otherwise secured to the sidewalls of the boom in overlying relationship with the inserts for greater strength.

It has also been discovered that in some designs of cranes the mounting bracket for the secondary hydraulic cylinder which interconnects the main and jib booms is mounted in substantially overlying relationship to the mounting point of the main hydraulic cylinder piston. This arrangement makes it difficult to employ the method just referred to or the method disclosed in Applicant's co-pending application Ser. No. 823,597.

It has, however, been found that a straight line notch can be cut across the side walls extending from the bottom toward the top wall of the boom which will not interfere in any way with the mounting points of the two cylinders. Following this, the previous method steps can be employed, namely beinding the boom to its desired geometry fabricating the necessary configuration of insert and attaching the insert in place in the opening formed by the bending operation.

Accordingly, production of an improved method for retrofitting or modifying digging type cranes to make them suitable for lifting operations becomes the principal object of this invention with other objects thereof becoming more apparent upon a reading of the following brief specification considered and interpretted in view of the accompanying drawings.

OF THE DRAWINGS

FIG. 1 is an elevational view of a conventional digging type crane.

FIG. 2 is a view similar to FIG. 1 following modification of the main boom.

FIG. 3 is a partial elevational view showing the main boom with the notches cut in its side walls.

FIG. 4 is a veiw similar to FIG. 3 showing the boom following bending and with the insert in place.

FIG. 5 is a sectional view taken along the line 5—5 of FIG. 4.

FIG. 6 is a view similar to FIG. 1 showing a conventional digging type crane.

FIG. 7 is a view similar to FIG. 2 showing the crane following modification of the main boom in accordance with a modified method of the invention.

FIG. 8 is a partial elevational view showing the main boom with the notch of the modified method of the invention cut into the side walls thereof.

FIG. 9 is a view similar to FIG. 8 showing the boom following bending thereof and insertion and attachment of the insert.

FIG. 10 is a view similar to FIG. 8 showing a notch cut in a further modified embodiment of the invention and taking a different configuration.

FIG. 11 is a view similar to FIG. 9 showing the boom after bending of the same and insertion and attachment of the appropriately contoured insert.

BRIEF DESCRIPTION OF THE PREFERRED EMBODIMENTS

Referring first to FIG. 1 of the drawings, it will be noted that the crane, generally indicated by the numeral 10, includes a crawler type track system 11, a working platform 12, which supports an operators cab 13, and a power source 14. The working platform 12 is mounted or secured to the crawler or track mechanism 11 in a pivotable arrangement with all of the structure being quite conventional and well known in the art. For that reason, this structure has been shown schematically only. It should also be noted that a track support has been illustrated, but it will be understood that cranes of this general type are commonly mounted on trucks or wagons as well.

Mounted on the working platform 12 is a main boom 20 which is pivotally supported on the platform as at 21 so that the boom 20 can be elevated or depressed as desired in response to actuation of the main hydraulic cylinder 30 and the piston 30*a* which is itself pivotally mounted to the platform 31 and secured to the boom 20 by the bracket 33 at the pivot point 32.

Again, this basic structure is well known in the art and has not been described or illustrated in great detail.

A jib boom 40 is pivotally mounted at 41 on the outer end of the main boom 20. The main boom 20 also carries a support bracket 51 which mounts a second hydraulic cylinder 50 which is in turn secured to the jib at 52 so that the jib itself can be manipulated independently of the main boom 20. Again, this structure is essentially conventional.

FIG. 1 illustrates a boom having a configuration which is common for excavating or digging type cranes so that the maximum dimension of reach away from the working platform is achieved both in a direction parallel to the ground as well as in a direction beneath the ground level. It should be noted here that in FIG. 1 the jib boom 40 is illustrated at its maximum elevation.

In retrofitting, according to one method of the present invention, reference is made first to FIG. 3 of the drawings wherein it will be noted that a notch generally indicated by the numeral 60 has been cut into each of the side walls of the main boom 20 extending from the bottom wall 23 toward the top wall 22 thereof. This cut has been made between the point of connection of the bracket 33 and the bracket 51 which are attached to the main and secondary hydraulic cylinders respectively.

FIG. 4 illustrates how the main boom 20 can be bent about a pivot point adjacent its top wall so as to form, in effect, a V-shaped opening in the sidewalls.

In accordance with the teachings of one embodiment of this invention, inserts 70 are then fabricated so as to have a configuration which would conform to the configuration of the opening formed between the edges of the notch 60 once the main boom has been bent. These inserts are then inserted into the openings on each side wall and secured thereto by welding such as is indicated by the numeral 61.

If desired, this step may be followed by securing reinforcing plate 80 over the insert such as by welding it to the sidewall as indicated by numeral 81. There is a substantial torque load in this area and these plates will strengthen the boom.

At this point reference is made to FIG. 2 which will illustrate how the geometry of the main boom has been changed and how, effectively, the arc of movement with the overall apparatus has been changed. Stated simply, the arc has been thrown up into the air in effect to permit greater elevation for lifting purposes. Comparison of the position of jib boom 40 in FIGS. 1 and 2 will clearly illustrate the difference in operating capabilities and it should be noted that no change what so ever is required in the operating cylinders 30 and 50 to achieve this.

Accordingly then, FIG. 1 illustrates maximum elevation prior to retrofitting or modification while FIG. 2 shows maximum elevation after retrofitting in accordance with the teachings of this invention.

This change is particularly important with regard to scrap handling operations where a load is picked off the ground and deposited in a receptacle such as a hopper or a truck for example or in other instances where lifting is the primary requirement. Furthermore, the lifting capacity of the crane will have been greatly enhanced because of the fact that the lifting operation takes place in a more direct vertical line and closer to the center of gravity of the prime mover.

Referring to FIGS. 6 through 9 of the drawings, it will be seen that a modification of the method has been illustrated. Similar components have been referred to by similar reference numerals adding, however, one integer thereto so that the main boom 20 of FIG. 1 becomes the main boom 120 of FIG. 6.

FIG. 8 thus illustrates how a notch 160 has been cut in the side walls more or less on a horizontal line as contrasted to the direction of the notch 60 of FIG. 3. The angle of cut is to some extent dictated by the positioning of brackets 133 and 151, but the object is to cut as nearly as possible on a line normal to the planes of the top and bottom walls 123,122 of the boom 20 rather than along the long axis thereof. However, the rest of the method is accomplished in the same fashion, namely by bending the boom 120 to the configuration of FIG. 9; fabricating the necessary inserts 170 and securing them in the opening such as by welding at 161; and applying reinforcing plates 180, if desired.

FIGS. 10 and 11 disclose a further modification which can be employed with certain specific types of cranes wherein the mounting bracket 251 for the secondary piston is mounted in practically overlying relationship with regard to the mounting bracket 233 or even behind it for the primary or main piston.

In this form of the invention it will be noted that the notch 260 has been cut upwardly from the bottom wall 223 at an angle similar to the angle illustrated in FIG. 3 and then horizontally across the side wall similar to the disposition of the notch 160 of FIG. 8.

However, the remaining steps of the method are identical in that the main boom 220 is bent to the configuration shown in FIG. 11 following which the inserts 270 are fabricated to conform to the configuration of the opening thus formed and then welded into place as indicated at 261 and securing plates 280, if desired.

In all of the embodiments of the invention the geometry of the main boom is changed so that the end result is the same.

It should also be noted that in all of the embodiments illustrated and described herein a crane which has been primarily designed for digging or excavating purposes will have been converted into one whose primary function and operability will be for lifting purposes without any reduction in boom strength.

It should also be noted again that all of this will have been accomplished without modification of any part of the overall crane assembly or relocation of any of the components thereof except for the relatively simple but effective step of cutting the notches in the main booms 20, 120 and 220; bending them to the desired new configuration; fabricating the inserts 70, 170 and 270 and securing them in place in the openings thus formed. This effectively changes the geometry of the main booms and thereby completely transforms the operating characteristics of the overall crane assembly. No changes in the jib booms except for replacing the usual bucket with a clam shell, magnet or similar suitable arrangement are required. Furthermore, it should be specifically noted that neither the main nor secondary pistons require any modification either.

While a full and complete description of the invention has been set forth in accordance with the dictates of the Patent Statutes, it should be understood that modifications can be resorted to without departing from the spirit hereof or the scope of the appended claims.

What is claimed is:

1. A method of retrofitting a knuckle boom crane designed for excavating purposes, comprising the steps of:

(A) cutting a notch in the side walls of the main boom extending inwardly from the bottom wall thereof;

(B) bending said main boom so that the top wall of said main boom forms an obtuse angle;

(C) forming inserts having a configuration complemental to the opening formed by the edges of said notches; and (D) securing said inserts to the edges of said notches.

2. The method of claim 1 wherein said notches are cut on a line extending between the point of attachment of the main hydraulic cylinder piston and the point of attachment of the secondary hydraulic cylinder that interconnects the main boom and the jib boom.

3. The method of claim 1 wherein reinforcing plates are secured to the sidewalls in overlying relationship to said inserts.

4. The method of claim 1 wherein said notches are cut in said sidewalls in a direction as nearly normal to the planes of said top and bottom walls as possible without interference with the mounting points of the main hydraulic cylinder piston and the secondary hydraulic cylinder.

* * * * *